United States Patent
Rosenberger et al.

(10) Patent No.: US 12,428,332 B2
(45) Date of Patent: Sep. 30, 2025

(54) METHOD FOR PRODUCING A PREFORM OF AN ANTI-RESONANT HOLLOW-CORE FIBER

(71) Applicant: Heraeus Quarzglas GmbH & Co. KG, Hanau (DE)

(72) Inventors: Manuel Rosenberger, Hanau (DE); Yusuf Tansel, Hanau (DE); Jaqueline Plass, Hanau (DE); Jörg Werner, Hanau (DE)

(73) Assignee: HERAEUS QUARZGLAS GMBH & CO. KG, Hanau (DE)

( * ) Notice: Subject to any disclaimer, the term of this patent is extended or adjusted under 35 U.S.C. 154(b) by 155 days.

(21) Appl. No.: 18/256,117

(22) PCT Filed: Nov. 22, 2021

(86) PCT No.: PCT/EP2021/082401
§ 371 (c)(1),
(2) Date: Jun. 6, 2023

(87) PCT Pub. No.: WO2022/122350
PCT Pub. Date: Jun. 16, 2022

(65) Prior Publication Data
US 2024/0043311 A1 Feb. 8, 2024

(30) Foreign Application Priority Data
Dec. 9, 2020 (EP) .................................. 20212770

(51) Int. Cl.
*C03B 37/012* (2006.01)
(52) U.S. Cl.
CPC .... *C03B 37/0122* (2013.01); *C03B 37/01231* (2013.01); *C03B 2203/16* (2013.01); *C03B 2203/42* (2013.01)

(58) Field of Classification Search
CPC .............. C03B 37/012; C03B 2203/16; C03B 2203/42; C03B 23/207; C03B 37/0122; C03B 2203/14; G02B 6/023
See application file for complete search history.

(56) References Cited

U.S. PATENT DOCUMENTS 3,950,073 A * 4/1976 Horiguchi ................ G02B 6/04
385/125
11,405,107 B2 8/2022 Ma et al.
(Continued)

FOREIGN PATENT DOCUMENTS

CN 102298170 A 12/2011
CN 108083628 A 5/2018
(Continued)

OTHER PUBLICATIONS

Habib Md. Selim et al. "Single-mode. low loss hollow-core anti-resonant fiber designs" Optics Express, US, vol. 27, No. 4, Feb. 18, 2019 (Feb. 18, 2019), p. 3824 DOI: 10.1364/OE.27.003824 ISSN: 2161-2072, XP055799349; p. 3826, "2. Fiber geometry"; figure 1b.
(Continued)

*Primary Examiner* — Erin Snelting
*Assistant Examiner* — Steven S Lee
(74) *Attorney, Agent, or Firm* — Panitch Schwarze Belisario & Nadel LLP

(57) ABSTRACT

A method for producing a preform of an anti-resonant hollow-core fiber, comprising the method steps of
a) providing a cladding tube, which has a cladding tube inner bore and a cladding tube longitudinal axis, along which a cladding tube wall extends, which is limited by an inner side and an outer side
b) preparing a number of anti-resonance element preforms, which consist of several nested tubular structural elements, comprising an ARE outer tube and an
(Continued)

ARE inner tube inserted therein, wherein the structural elements have a structural element longitudinal axis, c) arranging the anti-resonance element preforms on the inner side of the cladding tube wall, and d) thermal fixing of the anti-resonance element preforms to the cladding tube wall by means of heat input.

15 Claims, 9 Drawing Sheets

(56) References Cited

U.S. PATENT DOCUMENTS

| | | | | |
|---|---|---|---|---|
| 2007/0266738 | A1* | 11/2007 | Gallagher | C03B 37/01211 65/393 |
| 2017/0160467 | A1* | 6/2017 | Poletti | H01S 3/06712 |
| 2018/0267235 | A1* | 9/2018 | Russell | C03B 37/02781 |
| 2019/0011634 | A1* | 1/2019 | Lyngsøe | C03B 37/0122 |
| 2020/0156987 | A1* | 5/2020 | Wheeler | G02B 6/02328 |
| 2020/0278491 | A1 | 9/2020 | Poletti et al. | |

FOREIGN PATENT DOCUMENTS

| | | | | |
|---|---|---|---|---|
| CN | 108351465 | A | | 7/2018 |
| CN | 109143460 | A * | | 1/2019 ......... G02B 6/02328 |
| CN | 109143460 | B | | 8/2019 |
| CN | 110831906 | A | | 2/2020 |
| CN | 111095059 | A | | 5/2020 |
| GB | 2566466 | A | | 3/2019 |
| JP | 2018150184 | A * | | 9/2018 |
| WO | 2019008352 | A1 | | 1/2019 |
| WO | WO-2019053412 | A1 * | | 3/2019 ....... C03B 37/01208 |

OTHER PUBLICATIONS

AF Kosolapov et al. "Hollow-core revolver fibre with a double-capillary reflective cladding" Quantum Electronics., GB, vol. 46, No. 3, Mar. 29, 2016 (Mar. 29, 2016), pp. 267-270DOI: 10.1070/QEL15972 ISSN: 1063-7818, XP055502520; p. 268; figure 2.

Bradley et al.—Record Low-Loss 1.3dB/km Data Transmitting Antiresonant Hollow Core Fibre, ECOC PDP (2018).

Poletti—Nested antiresonant nodeless hollow core fiber, Optics Express (2014).

Habib et al., "Single-mode. low loss hollow-core anti-resonant fiber designs," Optics Express, vol. 27, No. 4, pp. 3824-3836 (2019).

Kosolapov et al., "Hollow-core revolver fibre with a double-capillary reflective cladding," Quantum Electronics, vol. 46, No. 3, pp. 267-270 (2016).

Office Action and Search Report issued Mar. 11, 2025 in CN Application No. 202180081299.6.

* cited by examiner

METHOD FOR PRODUCING A PREFORM OF AN ANTI-RESONANT HOLLOW-CORE FIBER

BACKGROUND OF THE INVENTION

The invention relates to a method for producing a preform of an anti-resonant hollow-core fiber.

PRIOR ART

Conventional single-mode optical fibers of solid material have a core region of glass, which is surrounded by a cladding region of glass with a lower refractive index. The light guidance is thereby based on total reflection between core and cladding region. The interactions of the guided light with the solid material, however, are associated with an increased latency during the data transmission, and relatively low damage thresholds compared to high-energy radiation.

"Hollow-core fibers", in the case of which the core comprises an evacuated cavity, which is filled with gas or liquid, avoid or reduce these disadvantages. In hollow-core fibers, the interaction of the light with the glass is smaller than in solid core fibers. The refractive index of the core is smaller than that of the cladding, so that a light guidance by means of total reflection is not possible, and the light would usually escape from the core into the cladding. Depending on the physical mechanism of the light guidance, hollow-core fibers are divided into "photonic bandgap fibers" and "anti-resonance reflection fibers".

In the case of "photonic bandgap fibers", the hollow core region is surrounded by a cladding, in which small hollow ducts are arranged periodically. The periodic structure in the cladding causes the effect, which, with reference to the semiconductor technology, is referred to as "photonic bandgap", according to which light of certain wavelength ranges scattered at the cladding structures interferes constructively due to Bragg reflection in the central cavity, and cannot propagate transversely in the cladding.

In the case of the embodiment of the hollow-core fiber, which is referred to as "anti-resonant hollow-core fiber" (ARHCF), the hollow core region is surrounded by an inner cladding region, in which so-called "anti-resonant elements" (or "anti-resonance elements"; in short "AREs") are arranged. The walls of the anti-resonance elements, which are evenly distributed around the hollow core, can act as Fabry-Perot cavities, which are operated in anti-resonance and which reflect the incident light and guide it through the fiber core.

This fiber technology promises a low optical attenuation, a very broad transmission spectrum (also in the UV or IR wavelength range), and a small latency during the data transmission.

Potential applications of the hollow-core fibers are in the field of the data transmission, the high-performance beam guidance, for example for the material processing, the modal filtration, the non-linear optics, in particular for the supercontinuum generation, from the ultraviolet to the infrared wavelength range.

One disadvantage of anti-resonant hollow-core fibers is that modes of a higher order are not necessarily suppressed, so that they are often not purely of a single mode over large transmission lengths, and the quality of the output beam deteriorates.

In the paper by Francesco Poletti "Nested antiresonant nodeless hollow core fiber"; Optics Express, Vol. 22, No. 20 (2014); DOI: 10.1364/OE 22.023807, a fiber design is proposed, in the case of which anti-resonance elements are not formed as a simple singular structural element, but consist of several structural elements, which are nested. The nested anti-resonance elements are designed in such a way that core modes of a higher order are phase-adapted to the cladding modes and are suppressed, but not the fundamental core mode. The propagation of the fundamental core mode is thus always ensured, and the hollow-core fiber can be effectively made to be of a single mode over a limited wavelength range.

The effective mode suppression is a function of the center wavelength of the transmitted light and of the structural parameters of the fiber design, such as the radius of the hollow core, and the diameter difference of nested ring structures in the anti-resonance elements.

An anti-resonant hollow-core fiber is known from EP 3 136 143 A1 (referred to therein as "hollow-core fiber without bandgap"), in the case of which the core can also guide further modes, in addition to the fundamental mode. For this purpose, said core is surrounded by an inner cladding comprising "non-resonant elements", which provide a phase adaptation of anti-resonant modes with the higher modes.

The production of the hollow-core fiber takes place according to a so-called "stack-and-draw" technique, in that the output elements are arranged to form an axially parallel ensemble, and are fixed to form a preform, and the preform is elongated subsequently. A cladding tube comprising a hexagonal inner cross section is used thereby, and six so-called "ARE preforms" (anti-resonance element preforms) are fixed in the inner edges of the cladding tube. This preform is stretched in two stages into a hollow-core fiber.

A method for producing a preform for anti-resonant hollow-core fibers is known from WO 2018/169487 A1, in the case of which a first cladding region comprises a plurality of rods, and a second cladding region comprises a plurality of tubes, which are surrounded by an outer cladding tube. Rods, tubes, and cladding tube are joined by means of "stack-and-draw" technique to form a preform. Prior to the elongation of the preform, the preform end is sealed, which takes place by applying a sealing compound. For example, a UV adhesive is used as sealing compounds.

TECHNICAL OBJECT

Anti-resonant hollow-core fibers and in particular those comprising nested structural elements have complex inner geometries, which makes their exact and reproducible production more difficult. This applies all the more, because small dimensional deviations in the magnitude of the working wavelength of the light to be guided can already not be tolerated in order to adhere to the resonance or anti-resonance conditions, respectively. The configuration of the fiber preform can be the cause of deviations from the target geometry, and they can also occur due to unwanted deformations, which are not to scale, during the fiber drawing process.

In the case of the known "stack-and-draw" technique, many elements are to be joined in a positionally accurate manner. For example, six anti-resonance elements, each consisting of a tube and capillaries welded in on the inner tube wall on one side, have to be attached to the inner wall of a cladding tube, in order to produce known hollow-core fibers in the "NANF" design.

To realize small attenuation values and broad transmission ranges, the azimuthal position of the anti-resonance elements inside the cladding tube is also important in addition to an even wall thickness of the walls of the anti-resonance elements. This cannot be readily realized by means of the "stack-and-draw" technique.

It is the goal of the invention to specify a method for the cost-efficient production of an anti-resonant hollow-core fiber, which avoids limitations of conventional production methods.

It is a further goal of the invention to disclose a method, which provides for a large-volume production of anti-resonant hollow-core fibers.

It is in particular the goal of the invention to provide a method for producing a preform for anti-resonant hollow-core fibers, by means of which a high precision of the structural elements and an exact positioning of the anti-resonance elements can be reproducibly attained in a sufficiently stable and reproducible manner.

Disadvantages of the classic "stack-and-draw" technique, by means of which the required structural accuracies, in particular an exact positioning at specified azimuthal positions, cannot be attained easily, are to be avoided thereby.

PREFERRED EMBODIMENTS OF THE INVENTION

The features of the independent claims make a contribution to at least partially fulfilling at least one of the above-mentioned objects. The dependent claims provide preferred embodiments, which contribute to at least partially fulfilling at least one of the objects.

/1./ A method for producing a preform of an anti-resonant hollow-core fiber, comprising the method steps of
a) providing a cladding tube, which has a cladding tube inner bore and a cladding tube longitudinal axis, along which a cladding tube wall extends, which is limited by an inner side and an outer side,
b) preparing a number of anti-resonance element preforms, which consist of several nested tubular structural elements, comprising an ARE outer tube and an ARE inner tube inserted therein, wherein the structural elements have a structural element longitudinal axis,
c) arranging the anti-resonance element preforms on the inner side of the cladding tube wall, and
d) thermal fixing of the anti-resonance element preforms to the cladding tube wall by means of heat input,
characterized in that the method has the step of
e) introducing a contact element each into at least one anti-resonance element preform in such a way that the contact element increases the heat-absorbing mass of the anti-resonance element preform in step d), in order to slow down a heat flow from the cladding tube into the anti-resonance element preform during the thermal fixing.

/2./ The method according to embodiment 1, characterized in that step e) comprises the sequential steps of:
/A-1./ connecting the contact element to the anti-resonance element preform,
/A-2./ connecting the anti-resonance element preform to the cladding tube.

/3./ The method according to any one of the preceding embodiments, characterized in that step e) comprises the sequential steps of:
/B-1./ heat input to the assembly consisting of anti-resonance element preform and contact element,
/B-2./ first connecting of the contact element to the anti-resonance element preform by means of a first portion of the heat input,
/B-3./ second connecting of the anti-resonance element preform to the cladding tube by means of a second portion of the heat input.

/4./ The method according to any one of the preceding embodiments, characterized in that the contact element is designed in such a way that what applies is
C_cladding tube>C_contact element>C_anti-resonance element preform,
wherein
C_cladding tube is a heat capacity of the solid material of the cladding tube, averaged over a unit volume,
C_contact element is a heat capacity of the contact element and of the ambient air, averaged over the unit volume,
C_anti-resonance element preform is a heat capacity of the anti-resonance element preform and of the ambient air, averaged over the unit volume,
and the unit volume is 25% by volume larger than a volume of the contact element.

/5./ The method according to any one of the preceding embodiments, characterized in that the thermal fixing in step d) takes place by means of a flame-based process.

/6./ The method according to any one of the preceding embodiments, characterized in that the contact element is designed in a rod-like manner, in particular that the contact element
has a length of [5; 50] mm, in particular [10; 40] mm, in particular [12; 30] mm, and
has a diameter of [0.5; 10] mm, in particular [0.7; 7] mm, in particular [1; 5] mm.

/7./ The method according to any one of the preceding embodiments, characterized in that the contact element is introduced into the ARE outer tube of the at least one anti-resonance element preform.

/8./ The method according to any one of the preceding embodiments, characterized in that the contact element is introduced into the ARE inner tube of the at least one anti-resonance element preform.

/9./ The method according to any one of the preceding embodiments, characterized in that the arranging of the anti-resonance element preforms on the inner side of the cladding tube inner bore comprises an arranging of the anti-resonance element preforms at target positions of the inner side of the cladding tube wall, wherein the arranging of the anti-resonance element preforms takes place by means of a positioning template, which is to be inserted into the cladding tube inner bore, and which has holding elements for positioning the anti-resonance element preforms at the target positions.

/10./ The method according to any one of the preceding embodiments, characterized in that the cladding tube inner bore is created by means of machining, in particular by means of drilling, milling, grinding, honing, and/or polishing.

/11./ The method according to any one of the preceding embodiments, characterized in that the cladding tube has an outer diameter in the range of 65 to 300 mm, in particular 90 to 250 mm, and in particular has a length of at least 1 m.

/12./ The method according to any one of the preceding embodiments, characterized in that the method has a step of:

creating a cladding tube closure by means of an at least partial closing of a front-side end of the cladding tube inner bore.

/13./ A method for producing a secondary preform, from which a hollow-core fiber can be drawn, from a preform, produced according to any one of the preceding claims 1 to 12, having the step of
further processing the preform into the secondary preform, wherein the further processing comprises a one-time or repeated performance of one or several of the following hot-forming processes:
i) elongating,
ii) collapsing,
iii) collapsing and simultaneous elongating,
iv) adding additional cladding material,
v) adding additional cladding material and subsequent elongating,
vi) adding additional cladding material and simultaneous elongating.

/14./ A method for producing an anti-resonant hollow-core fiber from a preform, produced according to any one of the preceding embodiments 1 to 12, having the step of
further processing the preform into the anti-resonant hollow-core fiber, wherein the further processing comprises a one-time or repeated performance of one or several of the following hot-forming processes:
i) elongating,
ii) collapsing,
iii) collapsing and simultaneous elongating,
iv) adding additional cladding material,
v) adding additional cladding material and subsequent elongating,
vi) adding additional cladding material and simultaneous elongating.

/15./ The method according to any one of the preceding embodiments 13 or 14, characterized in that a relative inner pressure in the range of between 0.05 mbar-20 mbar is set during the elongating in the core region.

/16./ The method according to any one of the preceding embodiments, characterized in that the method has at least one of the following points:
a length of the contact element is between 40 mm and 60 mm, in particular 50 mm,
a radius of the contact element is between 0.25 mm and 5 mm, in particular 0.35 mm and 3.5 mm, in particular 0.8 mm and 1.5 mm, in particular 1 mm and 1.1 mm,
an outer surface of the contact element is between 2.8 mm$^2$ and 4.5 mm$^2$, in particular 3.80 mm$^2$,
a mass of the cladding tube in the unit volume is between 0.49 g and 0.55 g, in particular between 0.50 g and 0.54 g, in particular 0.52 g,
a mass of the contact element and the ambient air in the unit volume is between 0.34 g and 0.48 g, in particular between 0.40 g and 0.44 g, in particular 0.42 g,
a mass of the anti-resonance element preform and of the ambient air in the unit volume is between 0.14 g and 0.26 g, in particular between 0.17 g and 0.23 g, in particular 0.2 g,
the averaged heat capacities C_contact element=[68%; 92%]C_cladding tube and C_anti-resonance element preform=[21%; 51%] C_cladding tube, in particular C_contact element=[72%; 88%] C_cladding tube and C_anti-resonance element preform=[24%; 47%] C_cladding tube, in particular C_contact element= [76%; 85%] C_cladding tube and C_anti-resonance element preform=[28%; 44%] C_cladding tube,
the C_cladding tube in the temperature range [200° C.; 450° C.] is less than 0.70 J/(K), in particular less than 0.67 J/(K), in particular less than 0.62 J/(K), in particular less than 0.59 J/(K),
the C_cladding tube in the temperature range [200° C.; 450° C.] is more than 0.35 J/(K), in particular more than 0.42 J/(K), in particular more than 0.47 J/(K), in particular more than 0.51 J/(K),
the C_contact element tube in the temperature range [200° C.; 450° C.] is less than 0.55 J/(K), in particular less than 0.51 J/(K), in particular less than 0.48 J/(K), in particular less than 0.46 J/(K),
the C_contact element in the temperature range [200° C.; 450° C.] is more than 0.31 J/(K), in particular more than 0.33 J/(K), in particular more than 0.39 J/(K), in particular more than 0.41 J/(K),
the C_anti-resonance element preform in the temperature range [200° C.; 450° C.] is less than 0.3 J/(K), in particular less than 0.27 J/(K), in particular less than 0.23 J/(K), in particular less than 0.21 J/(K),
the C_anti-resonance element preform in the temperature range [200° C.; 450° C.] is more than 0.11 J/(K), in particular more than 0.13 J/(K), in particular more than 0.14 J/(K), in particular more than 0.17 J/(K),
wherein in particular the heat capacity of quartz glass is 1052 [J/kg K], the heat capacity of air is 1005 [J/kg K], the density of quartz glass is 0.0022 [g/mm$^3$] (or 2.2 g/cm$^3$, respectively), and the density of air is 0.0000012 [g/mm$^3$] (or: 1.2 kg/m$^3$, respectively) (measured under normal conditions).

In the present description, range specifications also include the values mentioned as limits. A designation of the type "in the range of X to Y" with regard to a variable A thus means that A can take the values X, Y, and values between X and Y. Ranges limited on one side of the type "up to Y" for a variable A therefore mean Y and less than Y as value.

Some of the described features are linked with the term "essentially". The term "essentially" is to be understood in such a way that under real conditions and manufacturing techniques, a mathematically exact interpretation of terms, such as "overlapping" "perpendicular", "diameter", or "parallelism" can never be provided exactly, but only within certain manufacturing-related error tolerances. For example, "essentially parallel axes" draw an angle of −5 degrees to 5 degrees to one another, and "essentially identical volumes" comprise a deviation of up to 5% by volume. A "device essentially consisting of quartz glass" comprises, for example, a quartz glass portion of >95 to <100% by weight. Furthermore, "essentially at a right angle" includes an angle of 85 degrees to 95 degrees.

DETAILED DESCRIPTION

The invention relates to a method for producing a preform of an anti-resonant hollow-core fiber. As part of a step a), a provision of a cladding tube takes place, which has a cladding tube inner bore and a cladding tube longitudinal axis, along which a cladding tube wall extends, which is limited by an inner side and an outer side.

A step b) comprises a preparation of a number of anti-resonance element preforms, which consist of several nested tubular structural elements, comprising an ARE outer tube and an ARE inner tube inserted therein, wherein the structural elements have a structural element longitudinal axis. A step c) comprises an arranging of the anti-resonance element preforms on the inner side of the cladding tube wall. A step d) comprises a thermal fixing of the anti-resonance element preforms to the cladding tube wall by means of heat input.

The solution of the objects is attained in that the method comprises in step e) an introduction of a contact element each into at least one anti-resonance element preform in such a way that the contact element increases the heat-absorbing mass of the anti-resonance element preform in step d), in order to slow down a heat flow from the cladding tube into the anti-resonance element preform during the thermal fixing.

The anti-resonance elements can be simple or nested structural elements of the hollow-core fiber. They have at least two walls, which, viewed from the direction of the hollow core, have a negative curvature (convex) or no curvature (flat, straight). They generally consist of a material, which is transparent for the work light, for example of glass, in particular of doped or undoped quartz glass (SiO2), a plastic, in particular of a polymer, of a composite material, or of crystalline material.

Components or component parts of the preform, which essentially turn into anti-resonance elements in the hollow-core fiber by means of simple elongation during the fiber drawing process, are referred to as anti-resonance element preforms. The anti-resonance element preforms can be simple or nested components, to which positioning aids can additionally be fixed. The anti-resonance element preforms have at least two walls, which, viewed from the direction of the hollow core, have a negative curvature (convex) or no curvature (flat, straight). By means of the further processing of the preform, in particular by means of hot-forming steps, intermediate products can be created, in which the original anti-resonance element preforms are present in a shape, which is changed compared to the original shape.

The preform is that component, from which the anti-resonant hollow-core fiber can be drawn. In the alternative, the preform can be further processed into a secondary preform, from which the hollow-core fiber is drawn. This further processing can comprise a one-time or repeated performance of hot-forming processes, such as, e.g., elongating, collapsing, or adding additional cladding material.

During the thermal fixing of the at least one anti-resonance element preform, a heat input is made from the outside on the cladding tube wall. This heat input can take place by means of a torch, such as, for instance, a hydrogen torch. The goal of the thermal fixing in step d) is a substance-to-substance bond between the anti-resonance element preform and the cladding tube wall. The introduced heat input thus has to be such that a substance-to-substance bond between the materials of the two elements is possible. This can be attained when the cladding tube wall and the anti-resonance element preform change at least partially from the solid state into the liquid, in particular viscous state. It turned out to be disadvantageous thereby that the heat input, which is necessary for the thermal fixing, can lead to a destruction of the at least one anti-resonance element preform.

The anti-resonance element preform is constructed of tubular structural elements, at least a part of which has a wall thickness in the range of 0.1 mm to 2 mm, preferably 0.2 mm to 1.5 mm. The required heat input for partially and/or completely melting this anti-resonance element preform can be smaller than the required heat input for changing the state of the cladding tube in such a way that a fixing of the anti-resonance element preform is possible. The thermal heat, which is introduced onto the cladding tube from the outside, can in particular lead to a temperature increase of the cladding tube inner bore, which is so quick that a thermal deformation and/or thermal destruction of the at least one anti-resonance element preform occurs. To prevent this and to thus ensure a precise positioning of the anti-resonance element preform in the preform, the invention discloses the use of a contact element, which increases the heat-absorbing mass of the anti-resonance element preform. The contact element can slow down the temperature rise during the thermal fixing.

This concept is also suitable for a reproducible and precise production method for anti-resonant hollow-core fibers on an industrial scale. It is in particular suitable for the precise production of anti-resonant hollow-core fibers comprising nested anti-resonance elements, which have inner diameters, which differ substantially from one another.

The accuracy of the positioning of the at least one anti-resonance element preform in the cladding tube is improved in that tubular structural elements are provided, at least a part of which has a wall thickness in the range of 0.2 and 2 mm, preferably a wall thickness in the range of 0.25 and 1 mm, and wherein a cladding tube with an outer diameter in the range of 65 to 300 mm, preferably with an outer diameter in the range of 90 to 250 mm, preferably with an outer diameter in the range of 120 to 200 mm is provided. These components can thereby in particular each have a length of at least 1 m.

An embodiment of the method is characterized in that the step e) comprises the sequential steps of:
 /A-1./ connecting the contact element to the anti-resonance element preform,
 /A-2./ connecting the anti-resonance element preform to the cladding tube.

As part of this method, a connecting of the contact element to the anti-resonance element preform takes place first. The heat flow, which passes through the cladding tube wall, heats up the anti-resonance element preform as well as the contact element. Both enter into a substance-to-substance bond. A bond, in particular a substance-to-substance bond, of the system of anti-resonance element preform and contact element with the cladding tube takes please subsequently. This sequential step sequence ensures that the heat-absorbing mass of the anti-resonance element preform is increased when the thermal fixing of the anti-resonance element preform takes place at the cladding tube inner bore.

An embodiment of the method is characterized in that the step e) comprises the sequential steps of:
 /B-1./ heat input to the assembly consisting of anti-resonance element preform and contact element,
 /B-2./ first connecting of the contact element to the anti-resonance element preform by means of a first portion of the heat input,
 /B-3./ second connecting of the anti-resonance element preform to the cladding tube by means of a second portion of the heat input.

In the case of this embodiment of the method, a sequential connecting of the elements of the preform takes place. As part of the first connecting, a substance-to-substance bond is created between the contact element and the at least one anti-resonance element preform. This bond is created by means of a first portion of the heat input.

As part of the thermal fixing in step d), a heat input takes place, in particular by means of a torch, to the cladding tube. In an embodiment alternative, the heat input to the cladding tube wall takes place from the outer side, the heat input on the cladding tube wall in particular takes place essentially at a right angle. The heat thereby flows through the tube wall, and impinges on the contact element at the cladding tube inner bore as well as on the at least one anti-resonance element preform. In a further embodiment alternative, the heat input takes place on the front surface of the cladding tube in the vicinity of the anti-resonance element preforms. This heat input can in particular take place by means of a focused flame. The heat thereby flows through the front surface of the cladding tube and enters into the tube wall there. The escape of the heat takes place—inter alia—at the cladding tube inner bore. There, the heat then acts on the contact element as well as the at least one anti-resonance element preform.

In an embodiment alternative, the thermal fixing in step d) takes place by using a wire-like connecting element made of glass, in particular quartz glass. This connecting element, also referred to as welding wire or welding additive, is heated up by means of the heat flow as part of the thermal fixing in step d). Due to the locally low mass of the connecting element, the latter can be slightly and/or completely melted, and thus serves as a type of adhesive, which promotes the substance-to-substance bond, between the elements cladding tube inner bore and anti-resonance element preform, which are to be connected.

In both embodiments, this first portion of the heat input heats up the contact element and the anti-resonance element preform in such a way that a first substance-to-substance bond is created. This substance-to-substance bond results in that the heat-absorbing mass of the anti-resonance element preform is increased in that region, in which a temperature increase takes place as part of step d) by means of the heat input.

By means of the increase of the heat-absorbing mass, the speed of the rise of the temperature and/or the maximally reachable temperature of the anti-resonance element preform is reduced with constant heat input. The risk of a thermal destruction and/or thermal change of the anti-resonance element preform is therefore also reduced. In the subsequent step /B-3/, the cladding tube, in particular the cladding tube inner bore, is heated up in such a way by means of the second portion of the heat input that a substance-to-substance bond of the cladding tube with the anti-resonance element preform is attained. This second bond is the actual goal of the method according to the invention. By means of a use of the contact element according to the invention, it is ensured that the temperature on the cladding tube inner bore and the anti-resonance element preform, which is provided with the contact element, do not differ significantly. The temperature difference in the local region of the heat input between the cladding tube inner bore and the anti-resonance element preform is preferably less than 300° C., in particular less than 200° C., in particular less than 50° C.

Two opposing aspects are to be considered for the design of the contact element:

If the contact element is designed to be too large, it absorbs too much thermal energy as part of step e), and thus prevents a quick substance-to-substance bond between the anti-resonance element preform and the cladding tube wall. As a result, the thermal heat source optionally acts on the cladding tube wall for too long, and damages the latter. The damage can thereby consist in a complete melting of parts of the cladding tube wall, or in a deformation of the cladding tube wall by means of the flame pressure. In the alternative or in addition, there is the risk in the case of a contact element, which is selected to be too large that the anti-resonance preform is closed during the thermal fixing. During the further processing, a pressure could thus build up in the anti-resonance preform, which leads to an unwanted deformation and/or expansion of the anti-resonance preform.

If the contact element is designed to be too small, it cannot take over the object according to the invention of sufficiently increasing the heat-absorbing mass of the anti-resonance element preform. As a result, an exact positioning of the anti-resonance element preform does not take place or, in the worst case, even a destruction of the anti-resonance element preform.

An embodiment of the method is characterized in that the contact element is designed in such a way that what applies is C_cladding tube>C_contact element>C_anti-resonance element preform, wherein C_cladding tube is a heat capacity of the solid material of the cladding tube, averaged over a unit volume, C_contact element is a heat capacity of the contact element and of the ambient air, averaged over the unit volume, C_anti-resonance element preform is a heat capacity of the anti-resonance element preform and of the ambient air, averaged over the unit volume, and the unit volume is 25% by volume larger than a volume of the contact element.

The specific heat capacity C of a substance characterizes the heat capacity thereof, which is based on the mass. The specific heat capacity of a substance in a certain state is the heat, which is supplied to or removed from an amount of the substance, divided by the corresponding temperature increase or decrease, and the mass of the substance $$C = \frac{\Delta Q}{m \cdot \Delta T}$$

whereby

ΔQ is the heat, which is supplied to or removed from the substance, m is the mass of the substance, ΔT=T2−T1 is the difference of final and initial temperature.

In the case of homogenous bodies, the heat capacity can be calculated as product of the specific heat capacity C and the mass m of the body.

The unit volume refers to a volume V_unit volume, which is 25% by volume larger than the volume of the contact element V_contact element. Therefore:

V_unit volume=V_contact element+25% by volume*V_contact element

The averaged heat capacity identifies the arithmetic mean of the specific heat capacity of the materials located in the unit volume.

C_cladding tube thus identifies the heat capacity of the solid material of the cladding tube, averaged over a unit volume. The averaged heat capacity of the cladding tube C_cladding tube is therefore identical to the specific heat capacity of the solid material of the cladding tube.

Furthermore, C_contact element identifies a heat capacity of the contact element and of the ambient air, averaged over the unit volume. The specific heat capacity of the contact element thereby contributes 75%, and the heat capacity of the ambient air contributes 25% of the averaged heat capacity C_contact element of the contact element.

The averaged heat capacity of the anti-resonance element preform C_anti-resonance element preform is calculated from the heat capacity of the anti-resonance element preform and the ambient air, averaged over the unit volume. In the case of this calculation, the contact element is not considered. The averaged heat capacity of the anti-resonance element preform thus results over a contact element-free section of the anti-resonance element preform and the ambient air.

Due to the fact that the anti-resonance element preforms can be tubular structural elements, preferably having or consisting of quartz glass, which in particular have a wall thickness in the range of 0.2 mm to 2 mm, an embodiment is characterized in that C_anti-resonance element preform=[15%; 55%] C_cladding tube.

An embodiment is characterized in that the heat capacities, which are averaged over a unit volume, of the elements—cladding tube, contact element, anti-resonance element preform—which are thermally fixed as part of step f, are adapted to one another. By means of a corresponding design and adaptation of the averaged heat capacities, it is ensured that a substance-to-substance bond between the anti-resonance element preform and the cladding tube wall is attained with high precision. A grading of the three averaged heat capacities C_contact element=[68%; 92%] C_cladding tube
C_anti-resonance element preform=[21%; 51%] C_cladding tube balances two effects, which will be described below and which oppose one another. In particular, a grading of the three averaged heat capacities according to
C_contact element=[72%; 88%] C_cladding tube
C_anti-resonance element preform=[24%; 47%] C_cladding tube balances the two effects, which will be described below and which oppose one another. In particular, a grading of the three averaged heat capacities according to
C_contact element=[76%; 85%] C_cladding tube
C_anti-resonance element preform=[28%; 44%] C_cladding tube balances the two effects, which will be described below and which oppose one another.

An embodiment is characterized in that the C_cladding tube in the temperature range [200° C.; 450° C.] is less than 0.70 J/(K), in particular less than 0.67 J/(K), in particular less than 0.62 J/(K), in particular less than 0.59 J/(K).

An embodiment is characterized in that the C_cladding tube in the temperature range [200° C.; 450° C.] is more than 0.35 J/(K), in particular more than 0.42 J/(K), in particular more than 0.47 J/(K), in particular more than 0.51 J/(K), An embodiment is characterized in that the C_contact element in the temperature range [200° C.; 450° C.] is less than 0.55 J/(K), in particular less than 0.51 J/(K), in particular less than 0.48 J/(K), in particular less than 0.46 J/(K).

An embodiment is characterized in that the C_contact element in the temperature range [200° C.; 450° C.] is more than 0.31 J/(K), in particular more than 0.33 J/(K), in particular more than 0.39 J/(K), in particular more than 0.41 J/(K).

An embodiment is characterized in that the C_anti-resonance element preform in the temperature range [200° C.; 450° C.] is less than 0.3 J/(K), in particular less than 0.27 J/(K), in particular less than 0.23 J/(K), in particular less than 0.21 J/(K).

An embodiment is characterized in that the C_anti-resonance element preform in the temperature range [200° C.; 450° C.] is more than 0.11 J/(K), in particular more than 0.13 J/(K), in particular more than 0.14 J/(K), in particular more than 0.17 J/(K).

An embodiment is characterized in that the method has at least one of the following points:
a length of the contact element is between 40 mm and 60 mm, in particular 50 mm,
a radius of the contact element is between 0.25 mm and 5 mm, in particular 0.35 mm and 3.5 mm, in particular 0.8 mm and 1.5 mm, in particular 1 mm and 1.1 mm,
an outer surface of the contact element is between 2.8 mm$^2$ and 4.5 mm$^2$, in particular 3.80 mm$^2$,
a mass of the cladding tube in the unit volume is between 0.49 g and 0.55 g, in particular between 0.50 g and 0.54 g, in particular 0.52 g,
a mass of the contact element and the ambient air in the unit volume is between 0.34 g and 0.48 g, in particular between 0.40 g and 0.44 g, in particular 0.42 g,
a mass of the anti-resonance element preform and of the ambient air in the unit volume is between 0.14 g and 0.26 g, in particular between 0.17 g and 0.23 g, in particular 0.2 g.

An embodiment of the method is characterized in that the contact element is designed in a rod-like manner.

An embodiment of the method is characterized in that the contact element has a material, which is transparent for a work light of the optical fiber, for example, glass, in particular doped or undoped quartz glass ($SiO2$). Only parts of the contact element can furthermore have quartz glass, and/or the contact element can consist of doped or undoped quartz glass.

An embodiment is characterized in that the thermal fixing in step e) takes place by means of a flame-based process. In the case of the flame-based process (such as the flame hydrolysis), hydrogen—also referred to as "H2"—is preferably used as combustion gas. It reacts with the oxygen—also referred to as "O2"—in the air. This exothermic reaction creates the energy required in step e).

An embodiment is characterized in that the contact element has a length of less than 15 cm, in particular less than 10 cm, in particular less than 8 cm, in particular less than 5 cm. In a further embodiment, the contact element has a length of more than 0.5 cm, in particular more than 1 cm, in particular more than 1 cm. A further embodiment is characterized in that the contact element is designed in a rod-like manner, in particular that the contact element has a length of [5; 50] mm, in particular [10; 40] mm, in particular [12; 30] mm, and has a diameter of [0.5; 10] mm, in particular [07; 7] mm, in particular [1; 5] mm. The contact element is preferably designed in a cylindrical manner. In a further embodiment, the contact element is designed to be made of identical material or essentially of identical material as the material of the anti-resonance element preform and/or as the material of the cladding tube.

Two requirements, which oppose one another, can be made on the size and geometric shape of the contact element. In an embodiment, the contact element is designed in such a way that due to the action of the contact element, a region of the anti-resonance element preform, which is to be connected, and a region of the cladding tube, which is to be connected, reach an essentially identical temperature or an essential identical aggregate state, respectively, essentially at the same point in time. This allows for a particularly high precision during the connection. This embodiment leads to contact elements, which are rather longer and more massive.

In a further embodiment, the contact element is designed to be as small as possible, in order to keep that region of the preform, which has to receive the contact element, as geometrically small as possible. Should the contact element likewise enter into a substance-to-substance bond with the anti-resonance element preform as part of step e), the contact element remains in the finished preform. If it is elongated into an anti-resonant hollow-core fiber, the contact element can lead to a clogging of the ARE outer tube and/or ARE inner tube, at least in some regions. This region, which cannot be elongated into a usable anti-resonant hollow-core fiber, should be kept as small as possible.

There are thus two requirements, which oppose one another, on the size of the contact element. The above-specified geometries combine the two requirements in the best way and thus provide for a high precision of the structural elements, and an exact positioning of the anti-resonance elements in a stable process.

An embodiment is characterized in that the contact element is introduced into the ARE outer tube of the at least one anti-resonance element preform. In this constellation, the contact element is arranged next to the ARE inner tube inside the ARE outer tube. To ensure the object according to the invention, the contact element can be designed in a crescent-like manner and can thus at least partially encompass the ARE inner tube. In the alternative, a cylindrical design of the contact element is also possible.

An embodiment is characterized in that the contact element is introduced into the ARE inner tube of the at least one anti-resonance element preform. This embodiment has the advantage that the contact element can be inserted easily into the ARE inner tube, which simplifies the production process. The contact element can furthermore have an outer diameter, which is smaller than the inner diameter of the ARE inner tube. Advantageously, the outer diameter of the contact element is maximally 95%, in particular 93%, in particular 90%, of the inner diameter of the ARE inner tube. Advantageously, the outer diameter of the contact element is at least 30%, in particular 35%, in particular 40%, of the inner diameter of the ARE inner tube. In an embodiment, the ARE inner tube and the contact element are made of identical material or are essentially made of identical material. This embodiment has the advantage that no contamination of the ARE inner tube occurs by means of the contact element as part of step e).

An embodiment is characterized in that the arranging of the anti-resonance element preforms on the inner side of the cladding tube inner bore comprises an arranging of the anti-resonance element preforms at target positions of the inner side of the cladding tube wall, wherein the arranging of the anti-resonance element preforms takes place by means of a positioning template, which is to be inserted into the cladding tube inner bore and which has holding elements for positioning the anti-resonance element preforms at the target positions. The positioning template has, for example, a shaft, which protrudes into the cladding tube inner bore and which is provided with holding elements in the form of several holding arms, which face radially to the outside. The structurally specified star-shaped arrangement of the holding elements facilitates the exact positioning of the anti-resonance element preforms at the respective target position and the fixing thereof.

The holding elements can have a non-positive and/or positive contact with the ARE anti-resonance element preforms. In an embodiment, the holding elements partially have an outer shape, which at least partially mirrors the outer shape of the anti-resonance element preforms. In an embodiment, the holding elements of the positioning template can have graphite, in particular consist of graphite. In an embodiment, the positioning template can consist of graphite.

An embodiment is characterized in that the cladding tube inner bore is created by means of machining, in particular by means of drilling, milling, grinding, honing, and/or polishing. Compared to other known forming techniques, these machining techniques provide more exact and more delicate structures by using heat and pressure, and avoid contaminations of the surfaces caused by forming tools.

The accuracy of the positioning of the preforms in the cladding tube is improved in that tubular structural elements are provided, at least a part of which has a wall thickness in the range of 0.2 and 2 mm, preferably a wall thickness in the range of 0.25 and 1 mm, and wherein a cladding tube with an outer diameter in the range of 65 to 300 mm, preferably with an outer diameter in the range of 90 to 250 mm, preferably with an outer diameter in the range of 120 to 200 mm, is provided. In addition, these components can thereby in each case have a length of at least 1 m.

These are relatively large-volume structural elements for forming anti-resonance elements. This simplifies the handling. In the case of a vertical arrangement of cladding tube and structural elements, the force of gravity additionally supports the parallelism and the vertical alignment of the structural element longitudinal axes, when the structural elements are in each case positioned at the target position on their upper front-side end.

An embodiment is characterized in that the anti-resonance elements are arranged around the hollow core with an odd-numbered symmetry.

An embodiment is characterized in that the method has a step of:
creating a cladding tube closure by means of an at least partial closing of a front-side end of the cladding tube inner bore.

As part of this method step, at least one of the front-side ends of the anti-resonance element preforms is partially closed, in order to create a cladding tube closure. The preform according to the invention is characterized by a larger outer diameter. Due to the fact that the available absolute geometry errors are scaled down more strongly during fiber drawing with the increasing outer diameter of the preform, a more precise manufacturing of the hollow-core fiber is thus made possible in general. It has been shown, however, that any enlargement of the preform outer diameter does not automatically lead to a more precise hollow-core fiber, but that the following measure is helpful to maintain a maximum relative geometry error of 3.5% in the wall thickness of the hollow-core fiber. All anti-resonance element preforms or at least a part form hollow ducts and are generally open on both sides. The free inner diameter of the hollow ducts is small, and usually lies in the range of several millimeters in the preform. During the hot-forming process, the preform is warmed up from the outside, so that a radial temperature gradient results in the preform volume. In the case of otherwise identical process conditions, the arising temperature difference—and thus the created viscosity differences—is larger, the thicker the preform. There is a risk that the hollow ducts shrink differently as a result of the surface tension and as a function of the local temperature. This risk is higher, the higher the radial temperature gradient and the thicker the preform. In contrast, the temperature gradient has no significant effects on the central hollow core. To deal with this effect in the case of the preforms, which are relatively thick according to the invention, the core region (hollow core) is left open during the fiber drawing process with vertical orientation of the longitudinal axes, but the otherwise open, upper end is at least partially closed by means of a cladding tube closure in the case of at least a part of the anti-resonance element preforms.

The above-mentioned objects are also solved by means of a method for producing a secondary preform, from which a hollow-core fiber can be drawn, from a preform, produced according to any one of the preceding embodiments, having the step of further processing the preform into the secondary preform, wherein the further processing comprises a one-time or repeated performance of one or several of the following hot-forming processes:
i) elongating,
ii) collapsing,
iii) collapsing and simultaneous elongating,
iv) adding additional cladding material,
v) adding additional cladding material and subsequent elongating,
vi) adding additional cladding material and simultaneous elongating.

A preform is the starting point for the production of the anti-resonant hollow-core fiber. In the method according to the invention, the preform is further processed into a secondary preform by performing one or several hot-forming processes.

During the elongating, the preform is lengthened. The lengthening can take place without simultaneous collapsing. The elongating can take place to scale, so that, for example, the shape and arrangement of components or component parts of the primary preform are reflected in the elongated end product. During the elongating, however, the primary preform can also be drawn not to scale, and the geometry thereof can be changed. During the collapsing, an inner bore is narrowed or ring gaps are closed or narrowed between tubular components. The collapsing is generally associated with an elongating. The secondary preform produced in this way can already be designed and suitable for drawing a hollow-core fiber. The secondary preform can optionally be further processed in that it is, for example, elongated, or additional cladding material is added to it.

The above-mentioned objects are also solved by means of a method for producing an anti-resonant hollow-core fiber from a preform, produced according to any one of the preceding embodiments, having the step of further processing the preform into the anti-resonant hollow-core fiber, wherein the further processing comprises a one-time or repeated performance of one or several of the following hot-forming processes:
i) elongating,
ii) collapsing,
iii) collapsing and simultaneous elongating,
iv) adding additional cladding material,
v) adding additional cladding material and subsequent elongating,
vi) adding additional cladding material and simultaneous elongating.

A preform is the starting point for the production of the anti-resonant hollow-core fiber. The anti-resonant hollow-core fiber is created by means of a hot process, in particular by elongating the preform.

During the elongating, the preform is lengthened. The elongating can take place to scale, so that, for example, the shape and arrangement of components or component parts of the primary preform are reflected in the elongated end product. During the elongating, however, the primary preform can also be drawn not to scale, and the geometry thereof can be changed. During the collapsing, an inner bore is narrowed or ring gaps are closed or narrowed between tubular components.

To elongate and create the anti-resonant hollow-core fiber from the preform, the preform can be guided perpendicularly through a furnace. A lower end of the preform, from which the anti-resonant hollow-core fiber is drawn in the form of a cone, is thereby warmed up to drawing temperature, wherein the drawn fiber is subsequently cooled down from the drawing temperature by means of a gas stream, which is directed opposite to the drawing direction.

In an embodiment, the anti-resonant hollow-core fiber is coated with an adhesion-promoting agent, wherein this step is performed during the drawing process during the glass fiber production, and the anti-resonant hollow-core fiber is subsequently coated with a plastic in a second subsequent step. This second step can be performed so as to be decoupled in terms of time from the drawing process of the glass fiber production. The plastic used for the coating can be one or several of the following substances: polyurethane acrylates, acrylates, polyolefins, polyamides (nylon), polyethers, polyurethane monoacrylates, fluoroalkyl methylacrylates, or polyimide.

Component parts of the preform comprise the cladding tube and the anti-resonance element preforms arranged therein, as well as additional cladding material, which is provided, for example, in the form of an overlay cylinder or several overlay cylinders, and which is collapsed onto the preform. A doping provides for the adaptation of the thermal expansion coefficients of adjacent preform parts, in order to avoid or to reduce tensions. Fluorine, chlorine and/or hydroxyl groups are preferably used as doping agents, which lower the viscosity of quartz glass. The doping can also be used to reduce the thermal stability of a component part in favor of the stability of an adjacent component part.

An embodiment is characterized in that a relative inner pressure (a negative pressure compared to the ambient atmospheric pressure) in the range of between −10 to −300 mbar, in particular −50 to −250 mbar, is set in the core region during the elongating of individual component parts into a finished preform. This pressure window ensures that the OD/ID ratio (ratio of outer diameter to inner diameter of the cladding tube) does not become too small as part of the elongating.

An embodiment is characterized in that that a relative inner pressure (a positive pressure compared to the ambient atmospheric pressure) in the range of between 0.05 mbar-20 mbar is set in the core region during the elongating of the preform into an anti-resonant hollow-core fiber. In the case of a relative inner pressure of less than 0.05 mbar, it may happen that the anti-resonance element preforms inflate too much. Vice versa, a relative inner pressure of more than 20 mbar in the core region can have the result that the gas pressure within the hollow ducts of the anti-resonance element preforms is not sufficient, so that they widen sufficiently in the hot-forming process.

The temperature of a heating zone during the hot-forming process should be as constant as possible. Advantageously, a temperature-controlled heating element is thus used during the hot-forming process, the target temperature of which is held exactly at +/−0.1° C. Temperature fluctuations in the hot-forming process can thus be limited to less than +/−0.5° C.

In the case of one embodiment, the provision according to step a) comprises an arranging of the anti-resonance element preforms at target positions on the cladding tube inner bore, wherein the arranging of the anti-resonance element preforms comprises a fixing measure and/or a sealing measure using an amorphous SiO2 particle-containing sealing or bonding compound. The sealing or bonding compound used for the sealing or fixing contains SiO2 particles, in particular contains at least 60% by weight of SiO2 particles, which are received, for example, in a dispersion liquid. This compound is applied between the surfaces, which are to be connected or sealed, respectively, and is generally paste-like when used. During the drying at a low temperature, the dispersion liquid is partially or completely removed and the compound is solidified. The sealing or bonding compound and in particular the solidified SiO2-containing sealing or bonding compound, which is obtained after the drying, meets the requirements for the fixing and sealing. The low temperature of below 300° C. required for this purpose promotes the adherence to the dimensional stability of the preform and avoids negative thermal effects.

By heating up to higher temperatures, for example during elongating the preform to the hollow-core fiber, the sealing or bonding compound is also suitable to form opaque or transparent glass. This takes place by means of sintering or glazing, wherein the sintering into opaque glass requires comparatively lower temperatures and/or shorter heat-up periods than a glazing to the complete transparency. The sealing or bonding compound can thus be compacted by means of warm-up and can be glazed by means of heat-up during the hot-forming process.

During the hot-forming process, the sealing or bonding compound does not disintegrate and it releases few contaminations. It is thus characterized by thermal stability and purity during the hot-forming process, and it avoids deformations as a result of different thermal expansion coefficients.

The features disclosed in the description can be significant for various designs of the claimed invention, both separately and in any combination with one another. The features disclosed for the preform or the anti-resonant hollow-core fiber are also disclosed for the method and vice versa.

The invention will be illustrated further in an exemplary manner below by means of figures. The invention is not limited to the figures.

FIGURES

FIG. 1 shows a partial longitudinal section through an anti-resonant hollow-core fiber, FIG. 2 shows a partial cross section through an anti-resonant hollow-core fiber, FIG. 3 shows a partial longitudinal section through a first embodiment of the preform according to the invention, FIG. 4 shows a partial cross section through the first embodiment of the preform according to the invention, FIG. 5 shows a partial longitudinal section through a second embodiment of the preform according to the invention, FIG. 6 shows a partial cross section through the second embodiment of the preform according to the invention, FIG. 7 shows an illustration of the preform according to the invention comprising the unit volumes, FIG. 8 shows a flow chart of a method for producing a preform, and FIG. 9 shows a flow chart of a method for producing an anti-resonant hollow-core fiber.

DESCRIPTION OF THE FIGURES

FIG. 2 shows a cross section of the anti-resonant hollow-core fiber 2400, which is illustrated in FIG. 1. This FIG. 2 clarifies the arrangement of an anti-resonance element 2410 on an inner surface 2480 limiting the hollow core 2470. The anti-resonance elements 2410 are constructed in a tubular manner, wherein the ARE fiber inner tube 2430 is connected by means of a substance-to-substance bond to the ARE fiber outer tube 2420.

The illustrated ARE fiber inner tube 2430 and/or ARE fiber outer tubes 2420 can partially have a wall thickness in the range of 0.2-2 µm. The illustrated cladding tube 2450 can have an outer diameter in the range of 90-250 mm with a length of at least 1 m. The inner diameter of the hollow core 2470 is preferably 10-50 millimeters.

The illustrated anti-resonant hollow-core fiber 2400 is produced from a preform 100, which will be described in more detail below. The production of the anti-resonant hollow-core fiber 2400 from the preform 100 thereby takes place in particular by means of a one-time or repeated performance of one or several of the following hot-forming processes: elongating 2300, collapsing 2100, adding 2200 additional cladding material.

Figure 1:
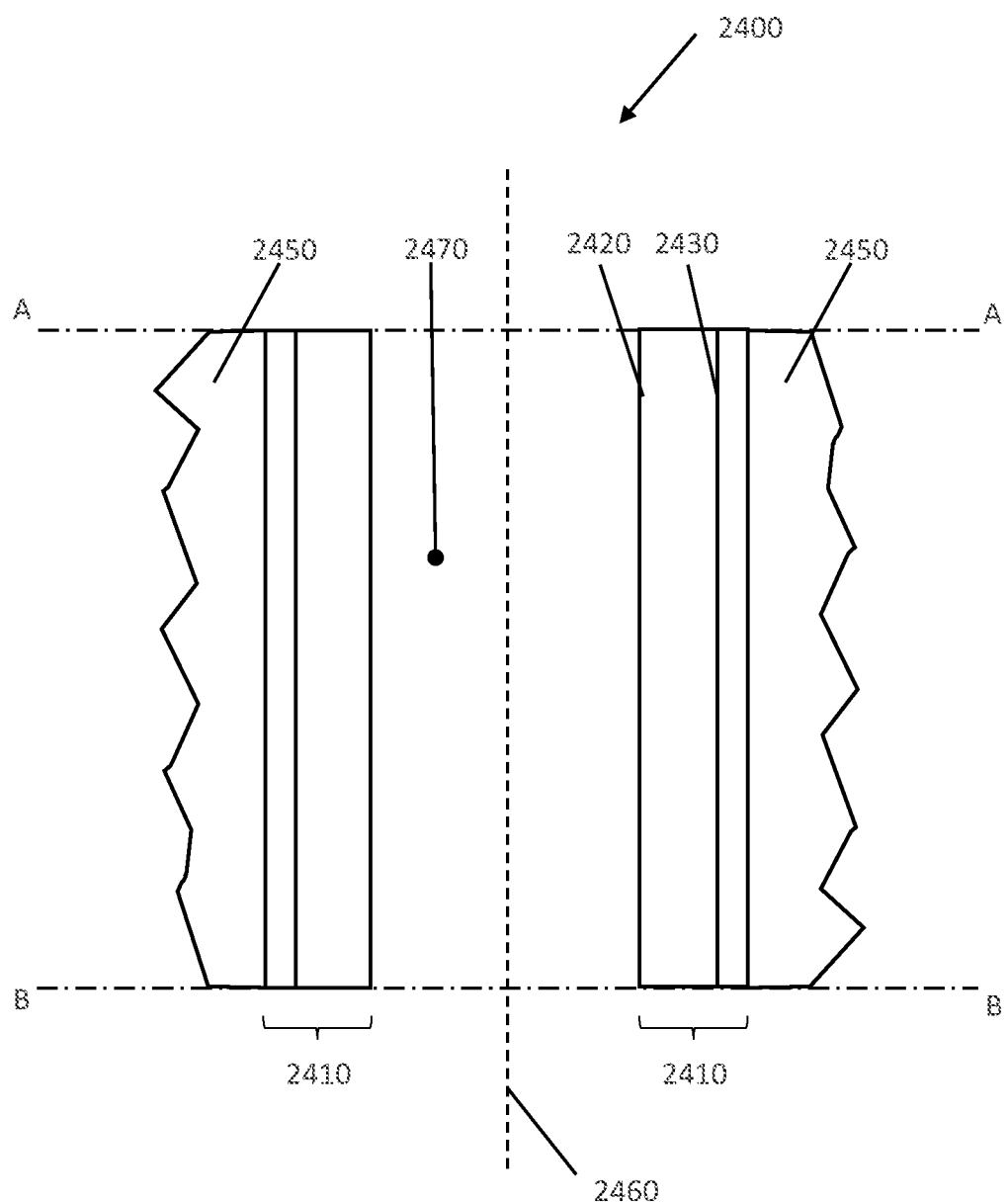
FIG. 1 shows a longitudinal section through an anti-resonant hollow-core fiber 2400.
Figure 2:
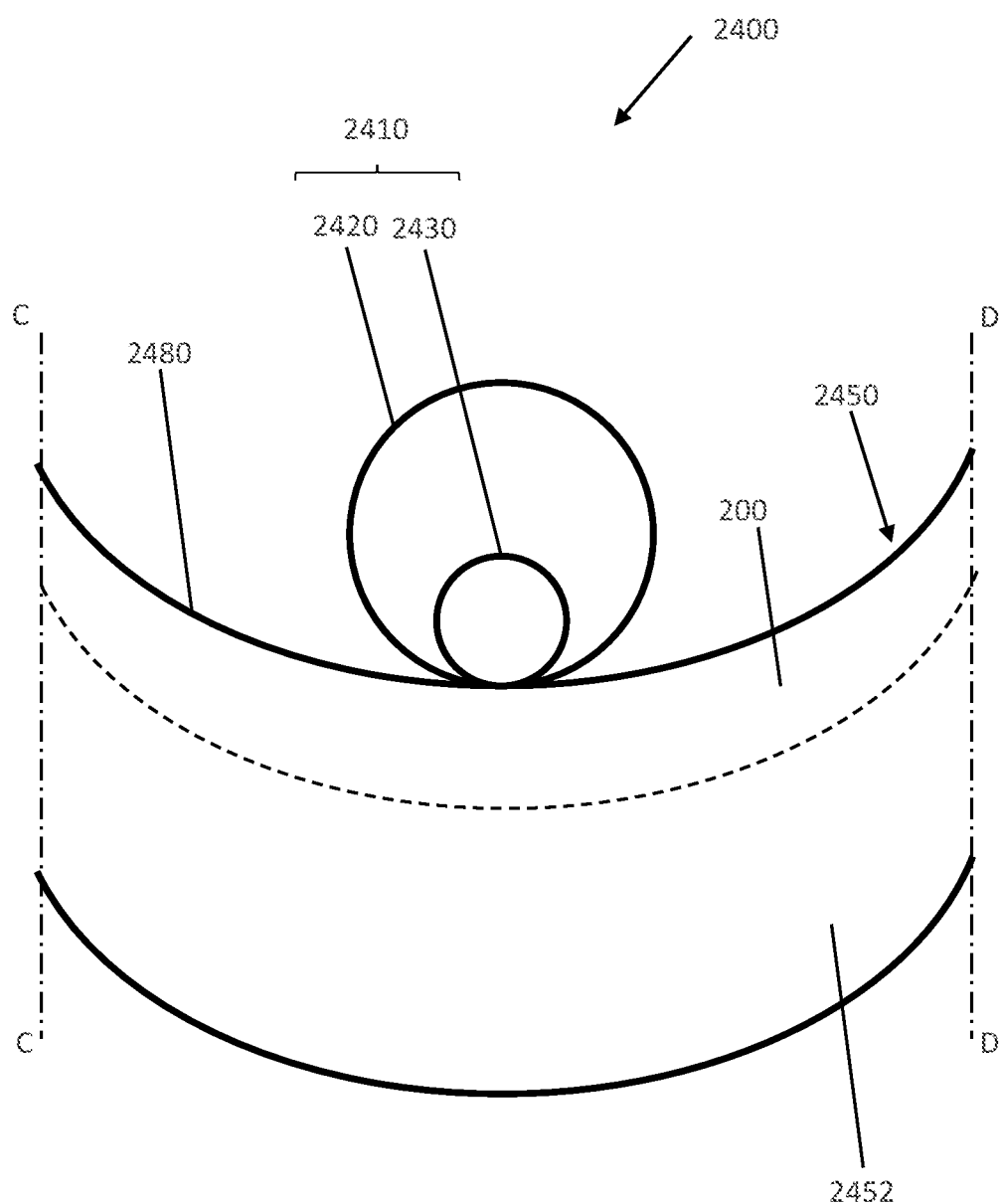
FIG. 2 shows a cross section of the anti-resonant hollow-core fiber 2400 illustrated in FIG. 1. What is illustrated is a section of the anti-resonant hollow-core fiber 2400 between 2 sectional lines A-A and B-B. The anti-resonant hollow-core fiber 2400 has a cladding 2450. In the illustrated embodiment of the anti-resonant hollow-core fiber 2400, the cladding 2450 consists of an elongated cladding tube 200 and an elongated cladding material 2452. Due to the fact that the cladding material 2452 and the cladding tube material 200 are designed to be of identical material in the illustrated embodiment, the transition between the two materials in FIG. 2 is marked only by means of a dashed line. The anti-resonant hollow-core fiber 2400 has a hollow core 2470. An electromagnetic wave can propagate through the hollow core 2470. In the illustrated embodiment, two anti-resonance elements 2410 are arranged inside the hollow core 2470. They are connected by means of a substance-to-substance bond to an inner surface 2480 of the cladding 2450. The anti-resonance elements 2410 have an ARE fiber outer tube 2420 and an ARE fiber inner tube 2430. The ARE fiber inner tube 2430 is arranged in the ARE fiber outer tube 2420. The anti-resonance elements 2410 are arranged parallel to a longitudinal axis 2460 of the anti-resonance hollow-core fiber 2400.
Figure 3:
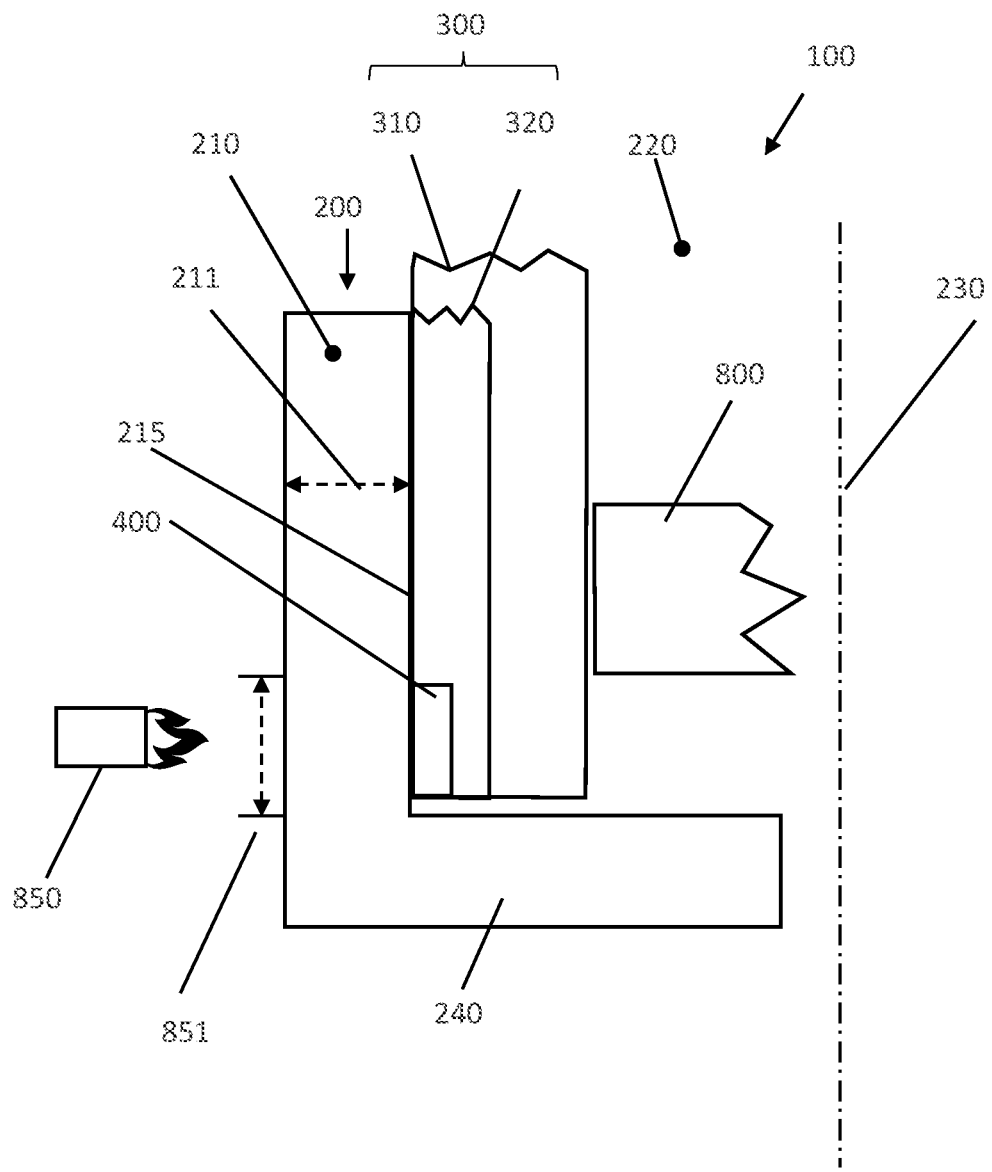
Figure 4:
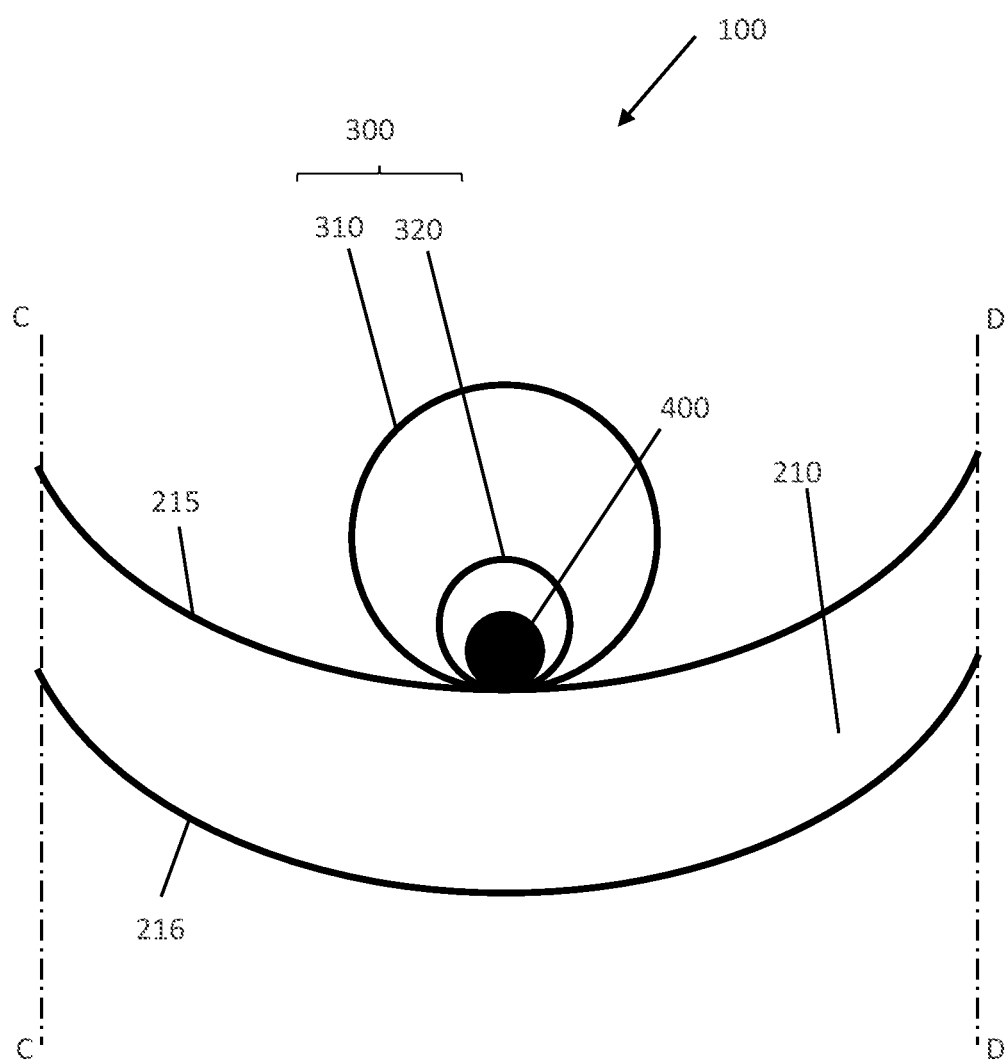

FIGS. 3 and 4 show a section of a first embodiment according to the invention of a preform 100 according to the invention of an anti-resonant hollow-core fiber 2400. The preform 100 has a cladding tube 200. The cladding tube 200 is designed in a tubular manner and comprises a cladding tube wall 210, which has a thickness 211 in the range of 20 mm to 150 mm, in particular 30 mm to 130 mm. An anti-resonance element preform 300 is arranged on an inner side 215 of the cladding tube 200. The at least one anti-resonance element preform 300 thereby ensures that the core mode can propagate in the central hollow core 2470 of the final hollow-core fiber 2400.

The anti-resonance element preform 300 comprises an ARE outer tube 310 and an ARE inner tube 320, both of which are designed in a tubular manner. The ARE outer tube 310 and/or the ARE inner tube 320 can have a wall thickness in the range of 0.1-2 mm. The ARE inner tube 320 can be connected by means of a substance-to-substance bond to the ARE outer tube 310. This bond takes place by means of a thermal attachment, which can take place in particular as part of a preparation 1200 of a number of anti-resonance element preforms 300. As part of this step of the preparation 1200, several tubular structural elements, which are nested, such as the ARE outer tube 310 and the ARE inner tube 320, can be assembled.

The thermal attachment as part of preparation 1200 can take place outside and/or also inside the cladding tube 200. As clarified in particular by FIG. 4, an anti-resonance element preform comprises an ARE outer tube 310 and an ARE inner tube 320 inserted therein. The thermal attachment can result in a substance-to-substance bond of the ARE inner tube 320 to an inner side of the ARE outer tube 310. A longitudinal axis of the ARE inner tube 320, which is specified by means of its tubular shape, is thereby located parallel to a longitudinal axis of the ARE outer tube 310, which is specified by its shape. The combination of the ARE outer tube 310 and of the ARE inner tube 320 therefore form a nested, tubular structural element, which has its own structural element longitudinal axis.

The shape of the cladding tube 200 is tube-like and/or cylinder-like and has a cladding tube longitudinal axis 230. On the inner side, the cladding tube 200 is provided with a cladding tube inner bore 220. A cladding tube wall 210, which is limited by an inner side 215 and an outer side 216, extends along the longitudinal axis 230. The cladding tube 200 can be closed at least partially on the end side by means of a cladding tube closure 214.

In a further step, the at least one anti-resonance element preform 300 is arranged 1300 in the cladding tube 200, which is provided 1100 in a first step. A thermal fixing 1500 of the at least one anti-resonance element preform 300 to the cladding tube wall 210 takes place subsequently by means of a heat input. A heat source 850, such as, for instance, a hydrogen torch, which thermally heats up a region 851 of the cladding tube wall 210, can serve to create this heat input. A substance-to-substance bond of the anti-resonance element preform 300 with the inner side 215 is the goal of the thermal heat-up. Only a partial substance-to-substance bond of the anti-resonance element preform 300 with the cladding tube 200 takes place in the warmed-up region 851 in an embodiment. The at least one anti-resonance element preform 300 is thus connected only in a pointwise manner to the cladding tube 200. This pointwise bond can take place at 5, in particular 3, in particular 2 locations along the length of the anti-resonance element preform 300.

In the illustrated embodiment, the cladding tube 200 and the at least one anti-resonance element preform 300 have a material, which is transparent for the work light of the optical fiber, for example glass, in particular doped or undoped quartz glass (SiO2). In an embodiment, the cladding tube 200 and the anti-resonance element preform 300 consist of doped or undoped quartz glass (SiO2).

The disclosed method is comprising an introduction 1400 of a contact element 400 each into the at least one anti-resonance element preform 300 in such a way that the contact element 400 increases the heat-absorbing mass of the anti-resonance element preform 300 in step d), in order to slow down a heat flow from the cladding tube 200 into the anti-resonance element preform 300 during the thermal fixing 1500 and/or in order to slow down a rise of the temperature of the anti-resonance element preform 300, triggered by the heat flow.

The contact element 400 serves the purpose of increasing the heat-absorbing mass of the anti-resonance element preform 300. As shown in FIG. 3, a heat flow emanates from the heat source 850 in the direction of the wall 210 of the cladding tube 200. In FIG. 3, the heat source 850 is arranged essentially at a right angle to the cladding tube wall. In the alternative, the heat source 850 can also heat up the front surface of the cladding tube in the vicinity of the anti-resonance element preform. Said heat flow leads to a temperature rise of the cladding tube wall 200, which finally also reaches the anti-resonance element preform 300. There is a risk that the reached temperature on the inner side 215 becomes so high and/or that the speed of the temperature rise is so high that a thermal damage to the at least one anti-resonance element preform 300 occurs and/or that the at least one anti-resonance element preform 300 is not fixed precisely and/or in a tension-free manner on the inner side 215 of the cladding tube wall 210. A fixing of the anti-resonance element preform 300, which is not tension-free and/or precise, however, results in that the resulting anti-resonance hollow-core fiber 2400 does not have the required attenuating properties.

To ensure a reliable and reproducible fixing of the anti-resonance element preform 300 to the cladding tube wall 210 in an industrial process, the use of the contact element 400 is provided, which increases the heat-absorbing mass of the anti-resonance element preform 300. By means of the contact element 400, the anti-resonance element preform 300 becomes more thermally inert in that region, in which the substance-to-substance bond of anti-resonance element preform 300 and cladding tube wall 210 is to take place.

In the case of the design of the contact element 400, two opposing properties need to be balanced.
  i) On the one hand, a contact element 400, which is as massive as possible, leads to a significant increase of the heat-absorbing mass of the anti-resonance element preform 300, and therefore ensures that the risk of a thermal destruction or deformation of the anti-resonance element preform 300 is reduced. A contact element 400, which is as large and massive as possible, therefore appears to be advantageous.
  ii) In the case of a contact element 400, which is too massive, on the other hand, the material of the anti-resonance element preform 300 cannot be heated up sufficiently to ensure a substance-to-substance bond with the cladding tube wall 210. By means of a corresponding increase of the heat input by means of the heat source 850, the substance-to-substance bond can be ensured in an emergency. However, the heat input by the heat source 850, which is then required, can be so large that it leads to a destruction of the cladding tube wall 210 in the region 851. A contact element 400, which is as small and has as little mass as possible, therefore appears to be advantageous. In the case of a contact element, which is selected to be too large, there is additionally or alternatively the risk that the anti-resonance preform 300 is closed during the thermal fixing 1500. During the further processing, a pressure could thus build up in the anti-resonance preform 300, which leads to an unwanted deformation and/or expansion of the anti-resonance preform 300.

A balanced dimensioning of the contact element 400 is therefore required.

As part of step d), an arranging 1300 of the at least one anti-resonance element preform 300 on an inner side 215 of the cladding tube wall 210 takes place. In an embodiment, this arranging 1300 can take place by means of non-positive and/or positive clamping elements. The clamping elements can thereby hold the anti-resonance element preforms 300 in the cladding tube 200 in particular on the end side. In a further embodiment, a positioning template 800, which holds the at least one anti-resonance element preform 300 in a specified position in a non-positive and/or positive manner, is arranged in the cladding tube 200. The arranging 1300 of the anti-resonance element preforms 300 on the inner side 215 of the cladding tube inner bore 220 can thus comprise an arranging of the anti-resonance element preforms 300 at target positions on the inner side of the cladding tube wall 210, wherein the arranging 1300 of the anti-resonance element preforms 300 takes place by means of a positioning template 800, which is to be introduced into the cladding tube inner bore and which has holding elements for positioning the anti-resonance element preforms 300 at the target positions. By means of an appealing selection of the geometry and materials, a reproducible accuracy of +/−5 mm can be attained with the help of the positioning template 800 during the positioning of the anti-resonance element preforms 300. Positioning templates 800, which consist of graphite, have turned out to be advantageous.

In an embodiment, the thermal fixing 1500 in step d) can be characterized in that step e) comprises the sequential steps of:
/A-1./ connecting the contact element 400 to the anti-resonance element preform 300,
/A-2./ connecting the anti-resonance element preform 300 to the cladding tube 200.

In the alternative or in addition, the thermal fixing 1500 in step d) can be characterized in that step e) comprises the sequential steps of:
/B-1./ heat input to the assembly consisting of anti-resonance element preform 300 and contact element 400,
/B-2./ first connecting of the contact element 400 to the anti-resonance element preform 300 by means of a first portion of the heat input,
/B-3./ second connecting of the anti-resonance element preform 300 to the cladding tube 200 by means of a second portion of the heat input.

Figure 5:
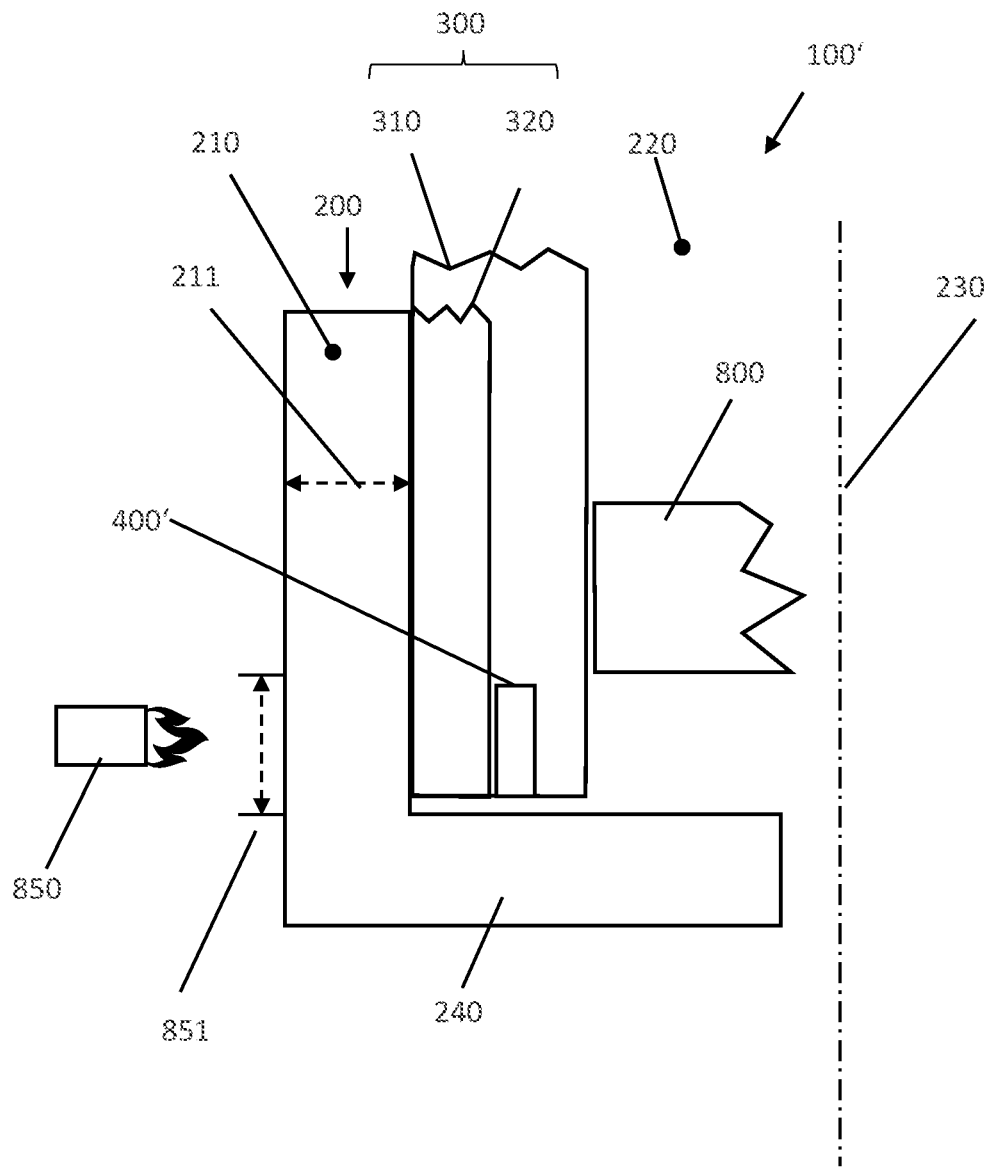
Figure 6:
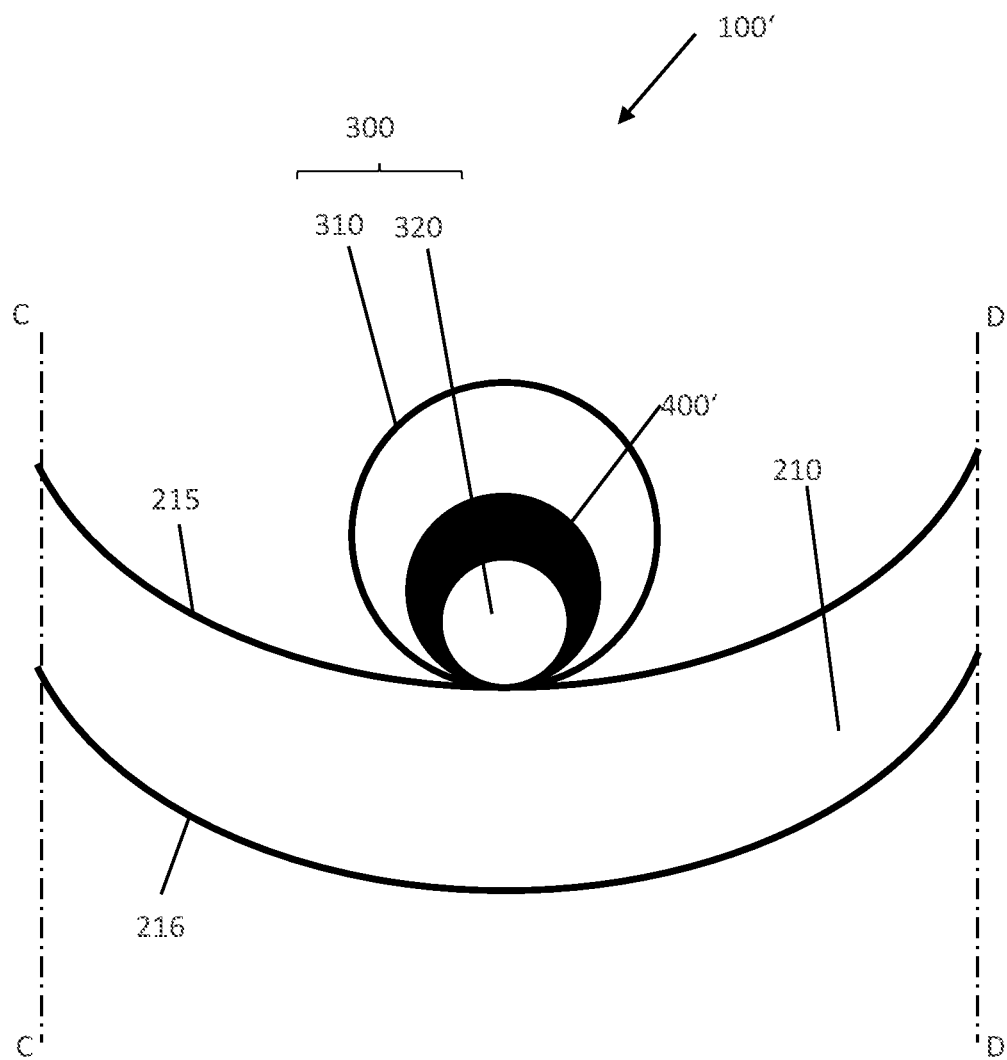

FIGS. 5 and 6 show an embodiment of the preform 100', which is produced by means of the disclosed method. The embodiment according to FIGS. 5 and 6 largely corresponds to the embodiment, which is described above and which is illustrated in FIGS. 3 and 4, so that reference is made to the above description in order to avoid repetitions. A structure, which is repeated from the description of FIGS. 3 and 4, has the same reference numeral. Modifications of a structure as compared to a structure shown in FIGS. 3 and 4 have the same reference numeral with an apostrophe (').

The preform 100' illustrated in FIGS. 5 and 6 differs from the embodiment illustrated in FIGS. 3 and 4 by the arrangement of the contact element 400. The preform 100' has a contact element 400, which is arranged in the ARE outer tube 310. In the case of the embodiment illustrated in FIGS. 4 and 5, in contrast, the contact element 400 was arranged in the ARE inner tube 320. As clarified in particular in FIG. 6, the contact element 400 can have a crescent-shaped structure, and can encompass the ARE inner tube 320 at least in some regions. With this type of design, an optimized outflow of the heat from the inner side 215 of the cladding tube wall 210 into the contact element 400 is ensured. However, sufficient heat simultaneously reaches a contact point between an outer side of the anti-resonance element preform 300 and the inner side 215 of the cladding tube wall 210, in order to attain a substance-to-substance bond.

By means of corresponding dimensioning of the contact element 400, it is ensured that, as part of the thermal fixing 1500, the geometric dimension of the anti-resonance element preform 300 is changed by less than 10%, in particular less than 5%, in particular less than 2%, in particular less than 1%. Geometric dimension is understood to be at least one of the following variables: radius of the ARE inner tube 320, radius of the ARE outer tube 310, wall thickness of the ARE inner tube 320, wall thickness of the ARE outer tube 310, deviation from an ideal circle geometry through the ARE inner tube, deviation from an ideal circle geometry through the ARE outer tube 310, circular surface of the ARE inner tube 320, and circular surface of the ARE outer tube 310.

Figure 7:
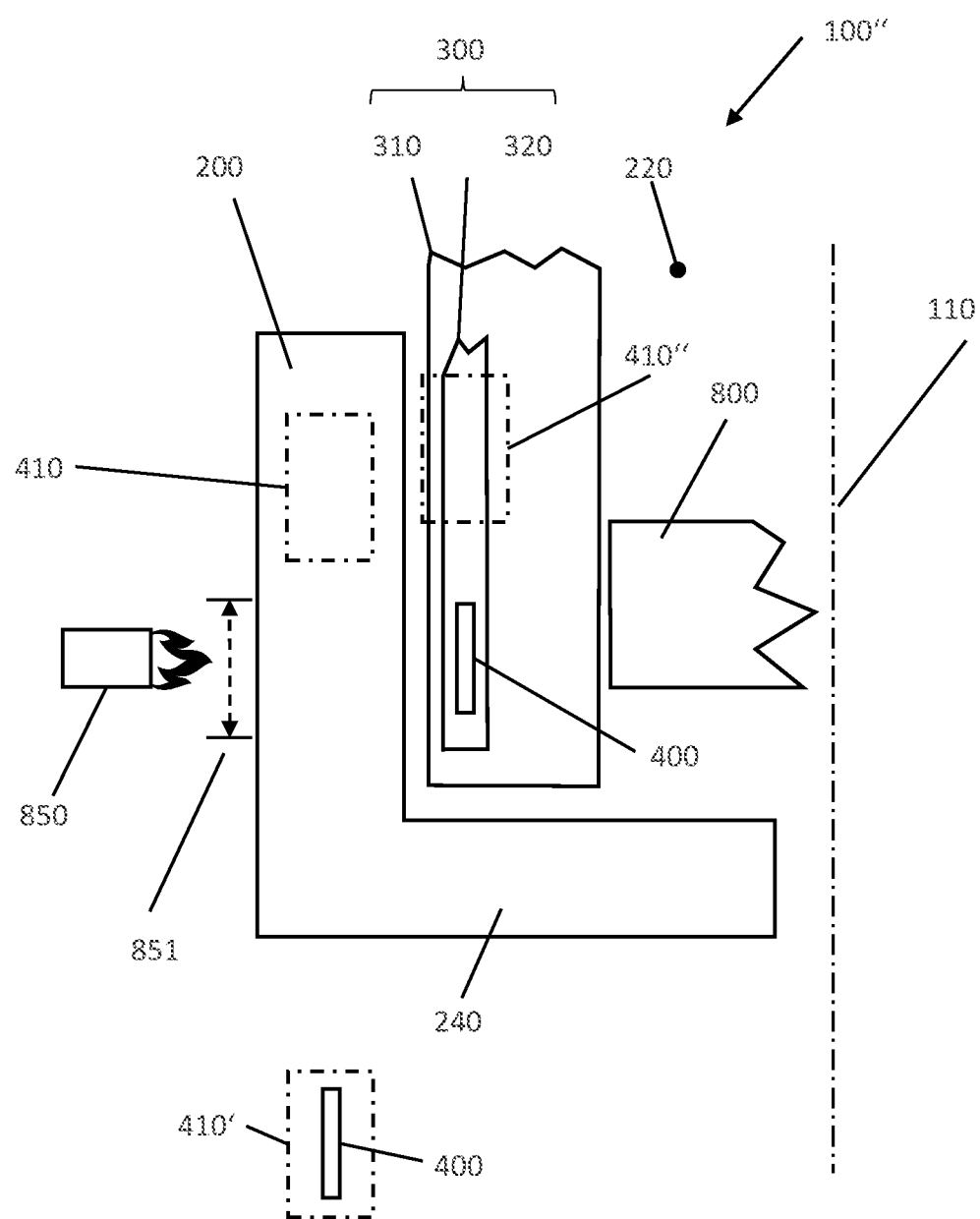

FIG. 7 shows an embodiment of the preform 100", which is produced by means of the disclosed method. The embodiment according to FIG. 7 largely corresponds to the embodiment, which is described above and which is illustrated in FIGS. 3 and 4, so that reference is made to the above description in order to avoid repetitions. A structure, which is repeated from the description of FIGS. 3 and 4, has the same reference numeral. Modifications of a structure as compared to a structure shown in FIGS. 3 and 4 have the same reference numeral with two apostrophes (").

The embodiment of the preform 100" shown in FIG. 7 is characterized in that the contact element 400 is designed in such a way that what applies is
C_cladding tube>C_contact element>C_anti-resonance element preform, wherein
C_cladding tube is a heat capacity of the solid material of the cladding tube 200, averaged over a unit volume 410,
C_contact element is a heat capacity of the contact element 400 and of the ambient air, averaged over the unit volume 410",
C_anti-resonance element preform is a heat capacity of the anti-resonance element preform 300 and of the ambient air, averaged over the unit volume 410",
and wherein the unit volume is 25% by volume larger than a volume of the contact element 400.

The averaged heat capacity "C_cladding tube" of the cladding tube 200 follows from an averaging over a unit volume 410 of the solid material of the cladding tube 200. The averaged heat capacity therefore corresponds to the specific heat capacity of the material, of which the cladding tube 200 is made. A volume, which is 25% by volume larger than the volume of the contact element 400, is thereby referred to as a unit volume.

The averaged heat capacity "C_contact element" of the contact element 400 follows from an averaging over a unit volume 410', which is 25% by volume larger than a volume of the contact element 400. An averaging thus takes place over the specific heat capacity of the material, of which the contact element 400 is made, and the air surrounding it (under normal conditions in accordance with DIN 1343).

To determine the averaged heat capacity "C_anti-resonance element preform" of the anti-resonance element preform 300, the unit volume 410" should be designed in such a way that it comprises that section, which is to be connected by means of a substance-to-substance bond to the inner wall of the cladding tube 200. This is illustrated in such a way in FIG. 7 that the unit volume 410" is cylindrical and surrounds parts of the ARE inner tube 320 as well as of the ARE outer tube 310. The longitudinal axis of the unit volume 410" is thereby aligned parallel to an imaginary longitudinal axis of the anti-resonance element preform 300. The averaged heat capacity of the preform 300 follows from an averaging over parts of the tubular structure 310, 320, which form the anti-resonance element preform 300, as well as the air, which is also included in the unit volume 410" (under normal conditions in accordance with DIN 1343).

The unit volume 410, 410', 410" can be selected in such a way that its shape essentially reflects the outer shape of the contact element 400, and is only enlarged in its dimensions in such a way that it is 25% by volume larger than the volume of the contact element 400. In the case of a contact element 400, which is designed in a cylindrical manner, the unit volume 410, 410', 410" can likewise be designed in a cylindrical manner. A diameter, which is enlarged compared to the contact element 400, as well as a larger length attain the volume, which is larger by 25% by volume.

In an embodiment, the contact element 400 has a material, which is transparent for a work light of the optical fiber, for example glass, in particular doped or undoped quartz glass (SiO2). In an embodiment, the contact element 400 consists of a material, which is transparent for a work light of the optical fiber, for example glass, in particular doped or undoped quartz glass (SiO2).

Figure 8:
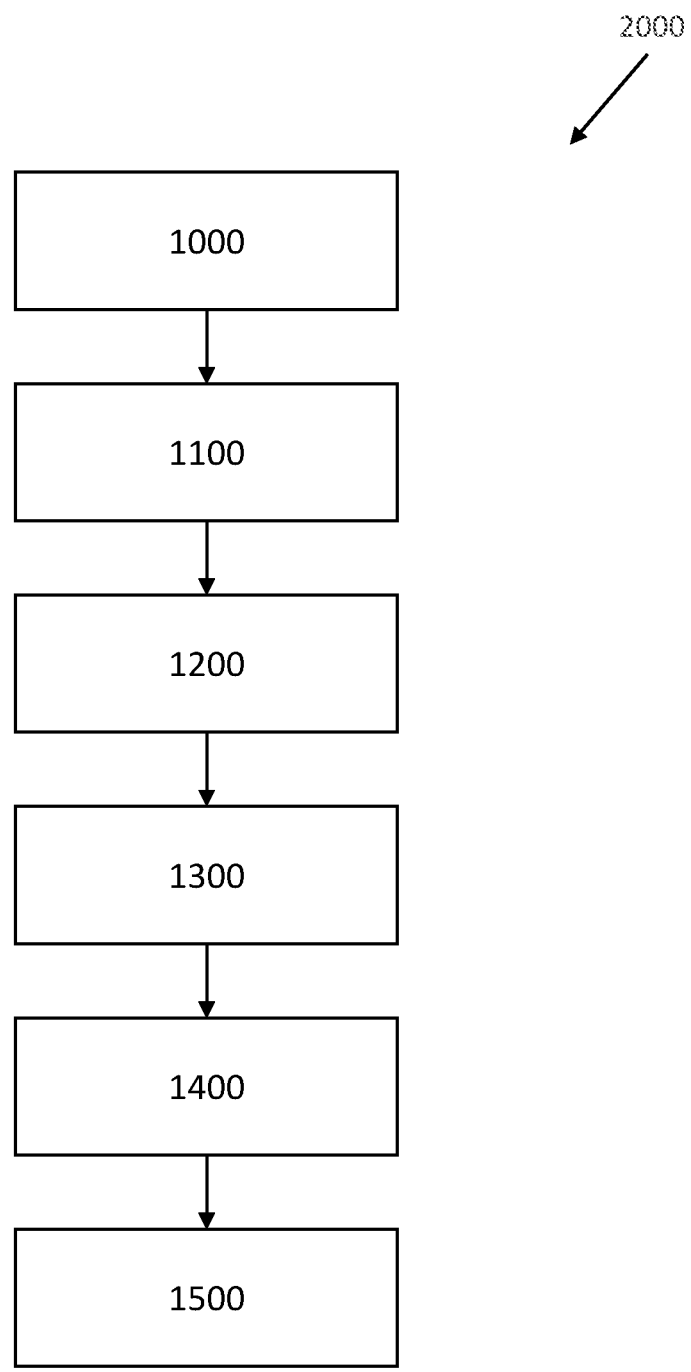

FIG. 8 shows an embodiment of a method 2000 for producing a preform 100 of an anti-resonant hollow-core fiber 2400 comprising the method steps of
- a. providing 1000 a cladding tube 200, which has a cladding tube inner bore 220 and a cladding tube longitudinal axis 230, along which a cladding tube wall 210 extends, which is limited by an inner side 215 and an outer side 216,
- b. preparing 1200 a number of anti-resonance element preforms 300, which consist of several nested tubular structural elements, comprising an ARE outer tube 310 and an ARE inner tube 320 inserted therein, wherein the structural elements have a structural element longitudinal axis,
- c. arranging 1300 the anti-resonance element preforms 300 on the inner side of the cladding tube wall 210, and
- d. thermal fixing 1500 of the anti-resonance element preforms 300 to the cladding tube wall 210 by means of heat input.

It is provided thereby that the method has the step of
- e. introducing 1400 a contact element 400 each into at least one anti-resonance element preform 300 in such a way that the contact element 400 increases the heat-absorbing mass of the anti-resonance element preform 300 in step d), in order to slow down a heat flow temperature rise from the cladding tube 200 into the anti-resonance element preform 300 during the thermal fixing 1500.

Figure 9:
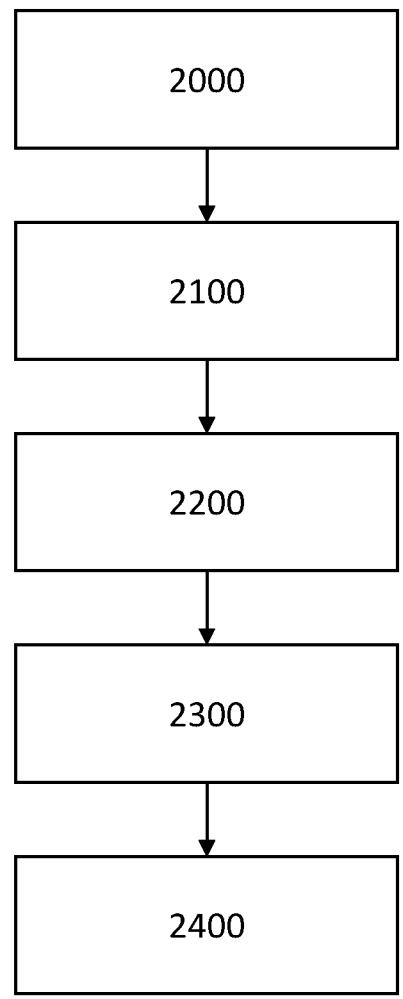

FIG. 9 shows an embodiment of a method for producing an anti-resonant hollow-core fiber 2400 from a preform 100, in particular produced according to any one of the preceding method steps 1000 to 1500, having the step of
further processing the preform 100 into the anti-resonant hollow-core fiber 2400,
wherein the further processing comprises a one-time or repeated performance of one or several of the following hot-forming processes:
collapsing 2100,
adding 2200 additional cladding material, and
elongating 2300.

Unless otherwise specified, all of the physical variables specified in the claims, the description, and in the figures, are determined under normal conditions in accordance with DIN 1343. The statement "under normal conditions" refers to measurements under conditions in accordance with DIN 1343. The features disclosed in the claims, the description, and in the figures, can be significant for various embodiments of the claimed invention, both separately and in any combination with one another. The features disclosed for the devices, in particular preform, secondary preform, or anti-resonant hollow-core fiber, are also disclosed for the method and vice versa.

REFERENCE NUMERALS 100 preform of an anti-resonant hollow-core fiber
200 cladding tube
210 cladding tube wall
211 thickness of the cladding tube wall
215 inner side of the cladding tube wall
216 outer side of the cladding tube wall
220 cladding tube inner bore
230 cladding tube longitudinal axis
240 cladding tube closure
300 anti-resonance element preform
310 ARE outer tube
320 ARE inner tube
400 contact element
410, 410', 410" unit volume
800 positioning template
850 thermal heat source
851 warmed-up region
1000 providing a cladding tube
1100 creating a cladding tube closure
1200 preparing a number of anti-resonance element preforms
1300 arranging the anti-resonance element preforms
1400 introducing a contact element each
1500 thermal fixing of the anti-resonance element preforms
2000 method steps 1000 to 1500
2100 collapsing
2200 adding additional cladding material
2300 elongating
2400 anti-resonant hollow-core fiber
2410 anti-resonance element
2420 ARE outer tube of the fiber
2430 ARE inner tube of the fiber
2450 cladding of the anti-resonant hollow-core fiber
2452 portion of the former cladding material at the cladding of the anti-resonant hollow-core fiber
2460 longitudinal axis of the anti-resonant hollow-core fiber
2470 hollow core of the anti-resonant hollow-core fiber
2480 inner surface

The invention claimed is:

1. A method for producing a preform of an anti-resonant hollow-core fiber, comprising the method steps of
a) providing a cladding tube, which has a cladding tube inner bore and a cladding tube longitudinal axis, along which a cladding tube wall extends, which is limited by an inner side and an outer side,
b) preparing a number of anti-resonance element preforms formed by nested tubular structural elements including an ARE outer tube and an ARE inner tube inserted therein, wherein the structural elements have a structural element longitudinal axis,
c) arranging the anti-resonance element preforms on the inner side of the cladding tube wall, and
d) thermal fixing of the anti-resonance element preforms to the cladding tube wall by means of heat input,
wherein—the method has the step of
e) introducing a contact element each into at least one anti-resonance element preform in such a way that the contact element increases the heat-absorbing mass of the anti-resonance element preform in step d), in order to slow down a heat flow from the cladding tube into the anti-resonance element preform during the thermal fixing, wherein the contact element is designed in such a way that what applies is C_cladding tube>C_contact element>C_anti-resonance element preform, wherein C_cladding tube is a heat capacity of the solid material of the cladding tube, averaged over a unit volume, C_contact element is a heat capacity of the contact element and of the ambient air, averaged over the unit volume, C_anti-resonance element preform is a heat capacity of the anti-resonance element preform and of the ambient air, averaged over the unit volume, and the unit volume is 25% by volume larger than a volume of the contact element.

2. The method according to claim 1, wherein step e) comprises the sequential steps of:
/A-1./ connecting the contact element to the anti-resonance element preform,
/A-2./ connecting the anti-resonance element preform to the cladding tube.

3. The method according to claim 1, wherein step e) comprises the sequential steps of:
/B-1./ heat input to an assembly including the anti-resonance element preform and contact element,
/B-2./ first connecting of the contact element to the anti-resonance element preform by means of a first portion of the heat input,
/B-3./ second connecting of the anti-resonance element preform to the cladding tube by means of a second portion of the heat input.

4. The method according to claim 1, wherein the thermal fixing in step d) takes place by means of a flame-based process.

5. The method according to claim 1, wherein the contact element is designed in a rod-like manner so that the contact element has a length of [5; 50] mm and has a diameter of [0.5; 10] mm.

6. The method according to claim 1, wherein the contact element is introduced into the ARE outer tube of the at least one anti-resonance element preform.

7. The method according to claim 1, wherein the contact element is introduced into the ARE inner tube of the at least one anti-resonance element preform.

8. The method according to claim 1, wherein the arranging of the anti-resonance element preforms on the inner side of the cladding tube inner bore comprises an arranging of the anti-resonance element preforms at target positions of the inner side of the cladding tube wall, wherein the arranging of the anti-resonance element preforms takes place by means of a positioning template, which is to be inserted into the cladding tube inner bore, and which has holding elements for positioning the anti-resonance element preforms at the target positions.

9. The method according to claim 1, wherein the cladding tube inner bore is created by means of machining.

10. The method according to claim 1, wherein the cladding tube has an outer diameter in the range of 65 to 300 mm.

11. The method according to claim 1, wherein the method has a step of:
creating a cladding tube closure by means of an at least partial closing of a front-side end of the cladding tube inner bore.

12. A method for producing a secondary preform, from which a hollow-core fiber can be drawn, from a preform, produced according to claim 1, having the step of
further processing the preform into the secondary preform,
wherein the further processing comprises a one-time or repeated performance of one or more of the following hot-forming processes:
i.) elongating,
ii.) collapsing,
iii.) collapsing and simultaneous elongating,
iv.) adding additional cladding material,
v.) adding additional cladding material and subsequent elongating,
vi.) adding additional cladding material and simultaneous elongating.

13. A method for producing an anti-resonant hollow-core fiber from a preform, produced according to claim 1, having the step of
further processing the preform into the anti-resonant hollow-core fiber,
wherein the further processing comprises a one-time or repeated performance of one or more of the following hot-forming processes:
i.) elongating,
ii.) collapsing,
iii.) collapsing and simultaneous elongating,
iv.) adding additional cladding material,
v.) adding additional cladding material and subsequent elongating,
vi.) adding additional cladding material and simultaneous elongating.

14. A method for producing a secondary preform, from which a hollow-core fiber can be drawn, from a preform, produced according to claim 1, having the step of
further processing the preform into the secondary preform,
wherein the further processing comprises a one-time or repeated performance of one or more of the following hot-forming processes:
i.) elongating,
ii.) collapsing and simultaneous elongating,
iii.) adding additional cladding material and subsequent elongating,
iv.) adding additional cladding material and simultaneous elongating.

15. The method according to claim 14, wherein a relative inner pressure in the range of between 0.05 mbar-20 mbar is set during the elongating in the core region.

* * * * *